March 20, 1951  A. W. COOK  2,545,685
COMPOUND MASTER CYLINDER

Filed July 23, 1946  3 Sheets-Sheet 1

INVENTOR.
Albert W. Cook
BY
*[signature]* -ATTORNEY

March 20, 1951  A. W. COOK  2,545,685
COMPOUND MASTER CYLINDER
Filed July 23, 1946  3 Sheets-Sheet 3
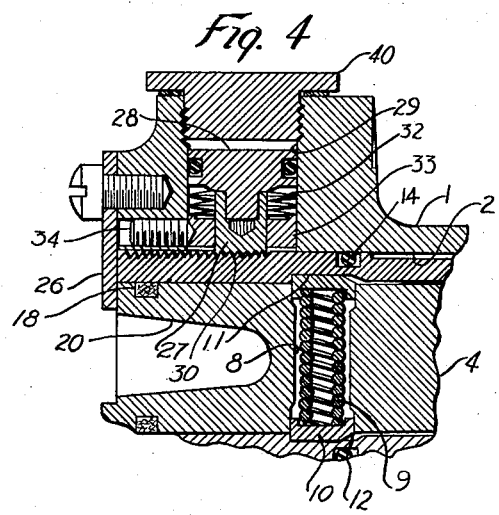
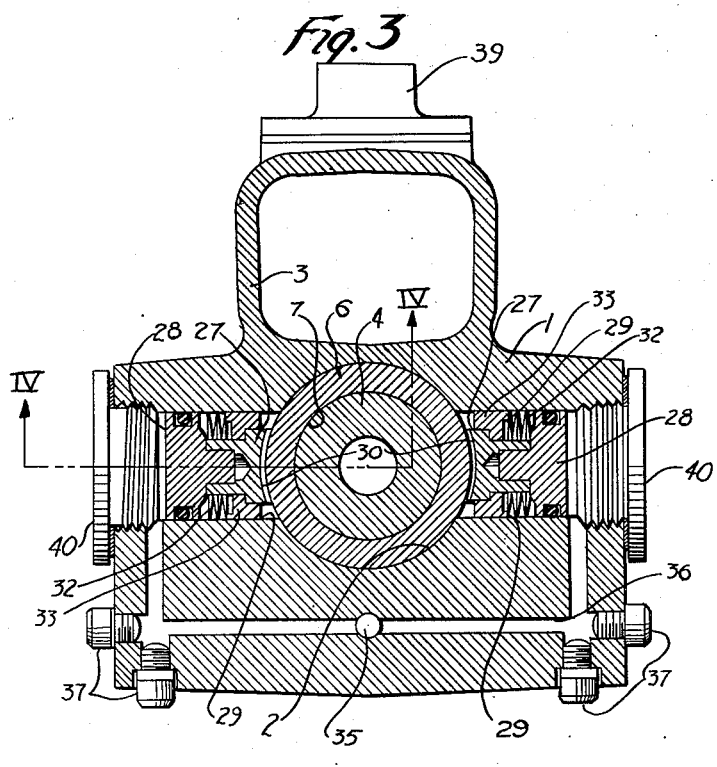
INVENTOR.
Albert W. Cook
BY Patented Mar. 20, 1951

2,545,685

UNITED STATES PATENT OFFICE 2,545,685

COMPOUND MASTER CYLINDER

Albert W. Cook, Akron, Ohio, assignor to Wingfoot Corporation, Akron, Ohio, a corporation of Delaware Application July 23, 1946, Serial No. 685,727

7 Claims. (Cl. 60—54.6)

This invention relates to fluid systems, especially to means for rapidly taking up the slack in hydraulic brake systems.

Heretofore, various types of means have been proposed for use in expediting brake action by taking up the slack in air or hydraulic brake systems. One proposal has been the use of double cylinders wherein one cylinder is of appreciably larger area so that the piston therein would rapidly take up the slack in the system and thereafter the brakes would be functioned by the piston in the smaller cylinder. Special constructions for holding open valves to permit direct action of fluid forced from a master cylinder to take up slack and then to close such valves and use indirect action of such fluid for brake action also have been proposed. None of the constructions heretofore proposed have been entirely satisfactory and this is at least partially due to poor action control of the double cylinder constructions in stopping piston action in the larger cylinder when the slack is removed from the system, and due to the difficulty of controlling the valves and in obtaining the desired quick take-up in the direct flow type of control.

The general object of this invention is to avoid and overcome the disadvantages of and objections to known types of slack take-up means in hydraulic systems, such as brakes, and to provide a slack take-up wherein the take-up means are locked against further action when a predetermined pressure is set up in the system.

A further object of the invention is to provide a compound piston having one section telescoped over the other and having the outer piston section used only when taking up the slack in the system and setting up a relatively low pressure therein.

Another object of the invention is to use the pressure set up in a hydraulic system for locking the supplemental, or take-up piston in nonoperative position.

A further object of the invention is to provide a positive-acting, compact, inexpensive slack take-up, having a rapid action, for a hydraulic brake system.

Another object of the invention is to provide a compound piston the parts of which normally move as a unit but can be moved separately upon application of a predetermined separation pressure thereto.

The foregoing, and other objects and advantages of the present invention which will be made more apparent as the specification proceeds, are achieved by the provision of a master cylinder, a compound piston received in said master cylinder and including telescoped inner and outer pistons, means controlled by the pressure in the master cylinder for locking the outer piston against movement when a predetermined pressure is set up in the master cylinder, releasable means for locking the pistons together to combine their action to effect a rapid take-up of any slack in the system, and means associated with the inner piston for moving it in the master cylinder regardless of whether or not the outer piston is engaged with it.

Reference is made to the accompanying drawings, wherein:

Fig. 3 is a vertical section taken on line III—III of Fig. 1; and

Fig. 4 is a fragmentary horizontal section taken on line IV—IV of Fig. 3.

Figure 1:
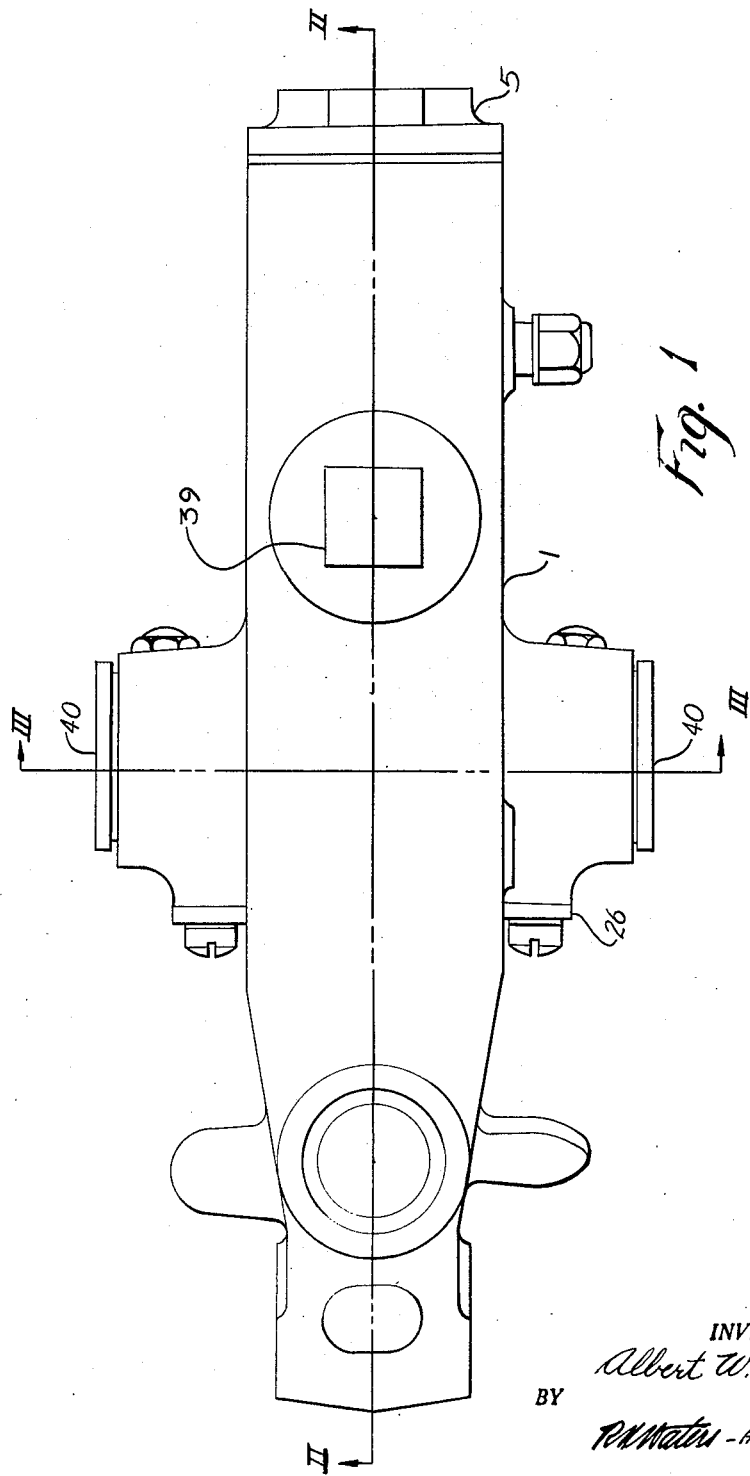
Fig. 1 is a plan of a master cylinder of a hydraulic system, which cylinder embodies the principles of my invention.

Referring in detail to the drawings, a housing 1 is shown which has a cylindrical bore 2 and a fluid reservoir 3 formed therein so that it is adapted to function as a master cylinder of a fluid system. A pressure piston 4 of a diameter substantially less than the bore 2 is received in it for setting up operative pressures in a fluid operated system, such as a set of hydraulic brakes, coupled to the bore 2 by a suitable fitting connected to the plug 5 which is engaged with the discharge end of the bore 2.

A prime feature of the invention is the provision of a take-up tubular piston 6 of larger diameter than the piston 4, which is of conventional size, or somewhat smaller than conventional size, for automotive brake systems, and which piston 6 has a bore 7 of such size as to be telescoped over the piston 4 so that a compact, compound piston is provided in the bore 2. The piston 6 is to move with the piston 4 in its initial movement in the bore 2 to expedite, or speed-up elimination of slack in the pressure system and to this end a transversely extending hole 8 is formed in the piston 4. A spring 9 is compressed in the hole 8 and it urges a pair of arcuate detents 10, with which it engages, out against recessed portions 11, usually part of an annular recess, formed in the bore 7 so that the pistons 4 and 6 are releasably locked together for unitary movement. The detents 10 preferably have beveled outer corners 12 and the recessed portions 11 may be beveled at the end thereof adjacent the discharge end of the bore 2 so that the detents 10 can be slid up out of the recessed portions 11 should one or the other piston be held against movement while the other piston has a force exerted thereon sufficient to slide the detents 10 out of the recesses 11.

Any conventional seal means may be used both to seal the take-up piston 6 in the bore 2 and to seal the piston 4 with relation to the bore. A rubber or other type of packing ring 13, which is of substantially V shape in section with the open end of the V being nearest the discharge end of the bore 2, is carried by the piston 4 at its pressure end for this purpose while O-rings 14 and 15 may also be positioned in annular recesses 16 and 17, respectively, formed in the outer surface of the piston 6 and in the bore 7, respectively. Further packing 18, such as felt packing to keep out dust and dirt, may be carried by the piston 4 at a point remote from its pressure face. A piston rod 19 is urged against the walls of a recess 20 in the outer end of the piston 4 to actuate the piston while a spring 21 is compressed between the pressure face of the piston 4 and a conventional valve assembly 22 carried by the plug 5 to urge the pistons to the no-load position shown in Fig. 2. The piston rod 19 may be actuated by a brake pedal or other conventional means (not shown). A cylindrical portion of the piston 4 may be removed at 23 at the pressure end of the piston to form a seat for the spring 21 and to permit formation of a slight flange 24 at the end of the piston 4 to aid in retaining the ring 13 in place. A flexible boot 25 may be secured to an end cover 26, carried by the housing 1 and through which the piston rod 19 extends, to seal that end of the housing.

A further important feature of the invention resides in the provision of means for locking the take-up piston 6 to the housing 1 when a predetermined pressure is set up in the bore 2. These means may include a pair of lock members, or shoes 27 which are carried by the inner ends of pistons 28 which are received in a pair of diametrically opposed holes 29 formed in the housing 1. The shoes 27 have teeth 30 formed on their inner ends for engaging with threads or ribs 31 formed on the rear portions of the piston 6. The shoes 27 are normally held out of engagement with the piston 6 by annular Belleville springs 32 extending between the radially inner surfaces of shoulders on the pistons 28 and stop rings 33 locked in the radially inner ends of the holes 29 by set screws 34. In order to function the pistons 28 at the desired times, a by-pass conduit 35 is formed in the housing 1 and it connects the bore 2 at a point adjacent its discharge end to the outer sections of the holes 29 by angularly extending end conduits 36. Thus, a predetermined pressure value in the bore 2 can be set up to cause the pistons 28 and shoes 27 to engage the piston 6 after such piston and the pressure piston 4 have moved through the bore 2 far enough to take-up, rapidly, the slack in the system connected to the bore 2 and operated by pressure set up in the bore. Then the pressure in the bore and fluid system, which may be about 125 lb. per sq. in., will be increased to give the final operational pressure by continued movement of the piston 4 by the piston rod 19. The conduits 35 and 36 may be formed in the housing 1 by drilling into it from its outer surface so that cap screws 37 may be engaged with the outer ends of such holes to seal them but permit flow through the connecting conduits formed completely inside the housing.

Figure 2:
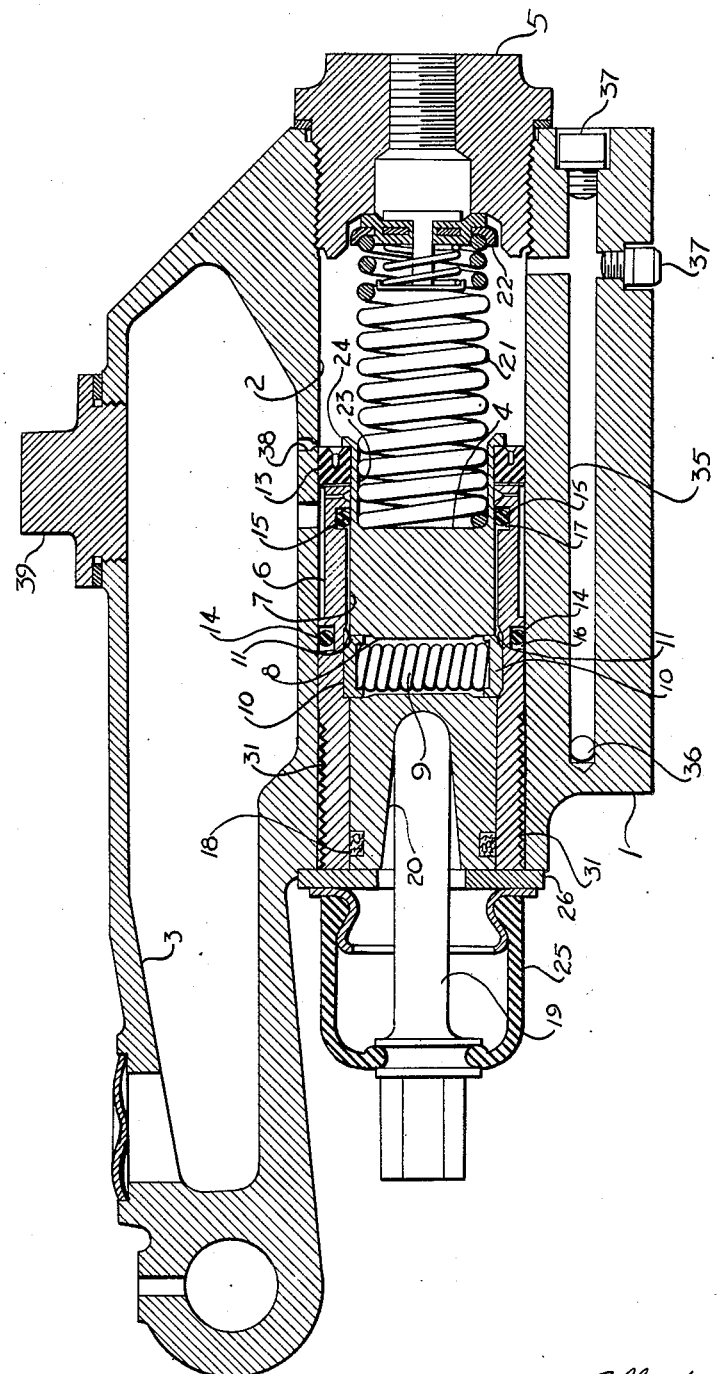
Fig. 2 is a vertical section taken on line II—II of Fig. 1.

Fig. 2 shows the no-load positions of the pistons 4 and 6 and brings out that an inlet port 38 between the fluid reservoir 3 and the bore 2 is open at no load condition to keep the system full of fluid. An inlet plug 39 is provided in the upper surface of the housing to permit addition of fluid to the reservoir 3.

The piston 4, on release of pressure from the piston rod 19, is moved back to its starting position (Fig. 2) by the spring 21. The detents 10 are engaged in the recesses 11 as the pressure piston 4 moves back into the take-up piston 6 and the pistons 4 and 6 are returned as a unit since the retraction of the piston 4 releases the pressure in the bore 2 so that the Belleville springs 32 expand and move the lock shoes 27 from engagement with the ribs 31 on the outer piston.

The outer ends of the holes 29 are closed by removable caps 40 which are engaged with the housing 1.

It is believed that the operation of the apparatus will be evident from the foregoing description. However, one feature which may not be understood is that the Belleville springs 32 for positioning the locking shoes 27 may be of the conventional compression type wherein the deflection is directly proportional to the load. On the other hand they may be of the type having constant load or reducing load deflection. This means that once the static friction of each locking shoe and piston is overcome by the built up pressure and the locking shoe and its associated piston starts to move toward locking position it will move completely into locking position without further increase in pressure. In other words, there is a tripping or past center movement which tends to snap the locking shoes to locking position once a given pressure is exceeded. This may sometimes be advisable to effect a quicker locking action.

While in accord with the patent statutes I have specifically illustrated and described one embodiment of my invention, it should be particularly understood that I am not to be limited thereto or thereby, but that the scope of my invention is defined in the appended claims.

What is claimed is:

1. In a hydraulic brake system, a master cylinder having a discharge end and having a side wall with a pair of diametrically opposed apertures therein, a piston received in said cylinder, means for forcing said piston towards the discharge end of said cylinder, resilient means for resisting movement of said piston and returning it to its no-load position, an outer tubular take-up piston telescoped into engagement with said piston and having a portion of its outer surface ribbed, spring detent means carried by said piston and engaging with a recessed portion of the inner surface of said tubular piston to couple said pistons in a releasable manner, a pair of lock members slidably received in the apertures in said cylinder wall and adapted to engage with the ribbed portion on said tubular piston to lock it against longitudinal movement in said master cylinder, spring means associated with said lock members for normally holding them in non-operative position, and cap means secured to the radially outer ends of the apertures in said cylinder wall, said master cylinder also having a by-pass conduit formed in its wall extending between a point adjacent the discharge end of the cylinder and the radially outer portions of the apertures in the side wall so that any pressures set up in said master cylinder are transmitted to said lock members to urge them into engagement with said tubular piston whereby said tubular piston will move with said piston until a predetermined pressure is set up in said master cylinder after which said tubular piston is locked in position by said lock members and said piston can continue its movements to set up greater pressure in said master cylinder.

2. In a hydraulic brake system, a master cylinder having a side wall with a pair of diametrically opposed apertures therein and having a discharge end, a piston received in said cylinder, means for forcing said piston towards the discharge end of said cylinder, an outer tubular piston telescoped into engagement with said piston and having ribs formed on a portion of its outer surface, spring detent means carried by said piston and engaging with said tubular piston to couple said pistons in a releasable manner, lock means slidably received in the apertures in said cylinder wall and adapted to engage with the ribbed portion on said tubular piston to lock it to the wall of said master cylinder, spring means associated with said lock means for normally holding them in non-operative position, and by-pass conduit means extending between a point adjacent the discharge end of said master cylinder and the apertures in the side wall of said cylinder so that any pressures set up in said master cylinder are transmitted to said lock means to urge them into engagement with said tubular piston at which time continued pressure by said piston forcing means on said piston disengages said detent means to permit individual movement of said piston.

3. In a hydraulic brake system, a master cylinder having a discharge end and having a side wall with a pair of diametrically opposed recesses in its bore, a piston received in said cylinder, means for forcing said piston towards the discharge end of said cylinder, a take-up tubular piston telescoped into engagement with said piston, seal means associated with said pistons to prevent leakage thereby, means carried by said piston and engaging with said tubular piston to couple said pistons in a releasable manner, a pair of piston members slidably received in the recesses in the bore of said cylinder and adapted to engage with said tubular piston to lock it to the wall of said master cylinder, spring means associated with said piston members for normally holding them in non-operative position, and by-pass conduit means connecting said cylinder to the recesses in the side wall of said cylinder so that any pressures set up in said cylinder are transmitted to said piston members to urge them into engagement with said tubular piston.

4. In a hydraulic brake system, a master cylinder having a side wall with a plurality of recesses formed in its bore and having a discharge end, a piston received in said cylinder, means for forcing said piston towards the discharge end of said cylinder, an outer tubular piston positioned in encompassing relation to said piston, spring means associated with said piston and said tubular piston to couple them in a releasable manner, lock means slidably received in the recesses in the bore of said cylinder and adapted to engage with said tubular piston to lock it to the wall of said master cylinder, spring means associated with said lock means for normally holding them in non-operative position, and by-pass conduit means connecting a point adjacent the discharge end of said cylinder and the recesses in the bore of said cylinder so that any pressures set up in said master cylinder are transmitted to said lock means to urge them into engagement with said tubular piston.

5. In a fluid operated system, a pressure piston having a transversely extending aperture therein, a tubular take-up piston snugly encompassing said pressure piston and having at least one recessed portion in its bore, a pair of detent members carried by said pressure piston in the aperture therein, and spring means compressed between said detent members to urge them radially outwardly of said pressure piston to engage the recessed portion in the bore of said take-up piston so that said pistons will move as a unit.

6. In a fluid operated system, a housing having a fluid containing bore formed therein, a piston received in the bore of said housing and reciprocable therein, piston means slidably received in the wall of said housing for substantially radial movement therein, the radially inner ends of said piston means being movable to positions within the bore of said housing and being adapted to engage with said piston to prevent its axial movement in said housing, spring means for urging said piston means radially outwardly with relation to the bore of said housing, means for forcing said piston axially of said housing to set up pressure therein, and conduit means formed in said housing for transmitting fluid from its bore to the radially outer surfaces of said piston means for forcing them into engagement with said piston when a predetermined pressure is reached in the bore.

7. A master cylinder including cylinder means, a pair of pistons housed in the cylinder means, means for moving both pistons simultaneously until the pressure created in the cylinder means exceeds a predetermined amount, locking shoes, diametrically opposed hydraulic means for moving the locking shoes into engagement with shoulders on one of the pistons but leaving the other free to move, means connecting the interior of said cylinder means to said hydraulic means for transmitting the cylinder pressure thereto and spring detents normally holding the pistons together for simultaneous movement.

ALBERT W. COOK.

REFERENCES CITED

The following references are of record in the file of this patent:

UNITED STATES PATENTS

| Number | Name | Date |
|---|---|---|
| 1,885,552 | Sawtelle | Nov. 1, 1932 |
| 2,041,164 | Carroll | May 19, 1936 |
| 2,106,304 | McGee | Jan. 25, 1938 |
| 2,295,487 | Loweke | Sept. 8, 1942 |
| 2,358,021 | Miller | Sept. 12, 1944 |

FOREIGN PATENTS

| Number | Country | Date |
|---|---|---|
| 707,153 | France | Apr. 13, 1931 |